United States Patent Office 2,914,495
Patented Nov. 24, 1959

2,914,495

WATER PAINT COMPRISING PIGMENT AND AQUEOUS EMULSION OF POLYVINYL ACETATE AND WAXY MAIZE STARCH

Philip L. Gordon and Albert E. Cohen, Lynn, Mass., assignors to The Borden Company, a corporation of New Jersey No Drawing. Application April 17, 1956
Serial No. 578,585

2 Claims. (Cl. 260—17.4)

This invention relates to polyvinyl acetate emulsions suitable for use as coating compositions. The invention is particularly useful in providing polyvinyl acetate water paint and will be first illustrated, therefore, by description in connection with such use.

Polyvinyl acetate paint emulsions have many advantages. Difficulties have arisen, however, in the compounding or use of previous formulations. These difficulties include the instability of the paint emulsion unless there is incorporated a costly stablizing agent, the incompatibility of the paint with butadiene-styrene polymer with which it is often desired to blend the polyvinyl acetate emulsion, and the requirement, for non-tackiness of the dried film of the paint, of a larger proportion of pigment than is sometimes necessary for proper functioning of the paint in other regards.

More specifically, polyvinyl acetate paints have been made with substantial proportions of polyvinyl alcohol, hydroxyethyl cellulose, or methyl cellulose as stabilizer. When it is attempted to keep the pigment content sufficiently low, as for use as a gloss or semi-gloss paint, the product shows a tendency of the dried film thereof to soften under humid conditions and to become tacky, so as to fail in blocking tests. Our composition, on the other hand, permits the use of pigment volume concentration (PVC) as low as 15%–20% in the finished paint film without tackiness appearing.

Our invention provides, in addition, a stabilized polyvinyl acetate paint that utilizes a low cost but satisfactory stabilizer of the emulsion and is compatible with the butadiene-styrene polymer.

The invention, briefly stated, comprises polyvinyl acetate emulsions for use as paint and other finishing compositions including as the vehicle the product of polymerizing vinyl acetate monomer in contact with pregelatinized starch, a preservative for the starch, and a pigment, all dispersed in water as the principal or sole volatile medium. In the embodiment of greatest commercial interest, the composition includes also a plasticizer for the polyvinyl acetate, a surface active agent, and a film coalescing agent, in addition to a defoamer and minor ingredients added for usual effects.

In general, our paint is made by mixing vinyl acetate monomer with an aqueous starch composition and polymerizing the monomer in contact with the starch in pregelatinized condition, an initiator and other materials that are conventional in polymerizing vinyl acetate. Thus we may effect the polymerization in contact with the starch and other materials as described in copending application of Cohen, a present inventor, and Breslouf, Serial No. 568,987, filed March 2, 1956. The result is an emulsion of polyvinyl acetate in which the starch is intimately associated. Pigment, plasticizer, and other paint components are admixed suitably after the said polymerization is completed.

As to materials, the vinyl acetate is ordinarily introduced as the simple monomer although it may include vinyl 2-ethylhexoate and 2-ethylacrylate, dibutyl fumarate and maleate, and like vinyl compound.

The starch component is suitably waxy cornstarch (amioca) or other variety of which examples are corn, potato, tapioca, rice and wheat starch. If the starch is not introduced in pregelatinized condition into the water in which the vinyl acetate is to be polymerized, the starch is conveniently gelatinized (pasted) by heating the aqueous mix including it to the gelatinization or pasting temperature for starch, before the polymerization of the vinyl acetate proceeds to a substantial extent.

Thus the starch and water mix is warmed to a temperature of about 70° C. or higher and suitably to 80°–85° C. until the starch appears to be completely dissolved. To the solution of starch so solubilized, the vinyl monomer or monomers are added slowly and polymerized at elevated temperature as added. Alternatively, the pasted starch may be dried as in a spray or on a drum drier, the product milled, if necessary, to convert it to powder form, and the powder redispersed in water just in advance of introduction of the vinyl monomer. The use of the starch in the form of an ether, such as methyl or ethyl ether, is unnecessary.

The preservative for the starch should be effective in its preserving action in contact with the other ingredients of our paint and not subject to substantial discoloration under conditions of use. Examples of preservatives that meet the requirement and that may be used are sodium pentachlorophenate (Dowicide A), the corresponding potassium salt, phenyl mercuric acetate, sodium benzoate, and the like.

The pigment to be used is any one that is usual in polyvinyl acetate water paints. Examples are titanium oxide (Ti-Pure R510, a rutile type), iron oxides such as the ochres and umbers, lithopone, phthalocyanine blue and green, carbon black, toluidine red and yellow, and Hansa yellow.

Plasticizers that may be used are dibutyl, diisobutyl, butyl benzyl, and dioctyl phthalate, dioctyl sebacate, and ethylene glycol adipate. They are substantially nonvolatile liquid ester solvents for the vinyl polymer.

The surface active agent serving to promote emulsification of the materials is any one commonly used in polyvinyl acetate emulsion paints. It must be effective in the aqueous mix, chemically inert with the other materials present, and not subject to discoloration in light. Examples of such agents that we use are those of the class alkyl aryl polyether alcohols such as Triton X–100 (condensation product of tertiary octyl phenol with 8–10 moles of ethylene oxide), Triton X–200 (sodium salt of alkyl aryl polyether sulfonate), sodium salt of octylphenoxyethoxyethyl sulfonic acid, an alkyl phenyl polyethylene glycol ether (Tergitol NP–14) such as octyl phenyl ether of diethylene glycol, sodium dodecylbenzene sulfonate, dioctyl ester of sodium sulfo-succinic acid (Aerosol OT), lecithin, and Emulphor O (condensation product of oleyl alcohol with 20 moles of ethylene oxide). Those are all anionic or nonionic surfactants.

A defoamer is introduced to advantage. It may be any one used heretofore in polyvinyl acetate water paints. Examples of satisfactory defoamers are an emulsified mixture of sodium soap of $C_{12}$–$C_{18}$ fatty acids with a nonionic emulsifier such as any surface active agent listed above and also with a mineral oil such as kerosene, octyl alcohol, mixed tributyl phosphate (1 part) and pine oil (3 parts), and dimethyl octynediol.

Conventional extenders of pigments may be incorporated. Examples are finely ground or precipitated calcium silicate (wollastonite), calcium carbonate, talc, clay, diatomaceous earth, mica, and barium sulfate.

Surface coalescing agents are advantageous in promoting low temperature coalescence and smoothness of the films after evaporation of water therefrom. The agent selected should be a solvent or dispersant for the polyvinyl acetate and plasticizer mixture and also be somewhat hydrophilic for proper action with the starch component. Suitable coalescing agents are the monoethyl or monoisopropyl ether of ethylene glycol, monobutyl ether of diethylene glycol, hexylene glycol, and the acetate of the monoethyl ether of diethylene glycol. Thus the proportion of the coalescing agent may vary as from 5/538 or about 0.93 part for 100 parts of total vinyl resin (Example 3) to 9/(250 x 54%) or about 6.7 parts of the coalescing agent for 100 of the resin (Example 5).

Materials to improve freeze-thaw resistance and promote brushing and flow of the paint during use are incorporated to advantage. Examples of such materials that we may use are ethylene and propylene glycols, glycerine, and diethylene glycol.

Other conventional ingredients are added for their usual effects and in usual amounts. They include an activator of polymerization of ethylenic bond polymerizable materials, of which an example is vinyl acetate, and a regulator of chain length in the polymerization of the vinyl acetate. These are introduced at the starch PVAc emulsion making stage. Suitable activators are potassium and ammonium persulfate, hydrogen peroxide, and mixed potassium persulfate and sodium bisulfite. All of these activators are per compounds and are oxidizing agents, with no content of reducing activator such as sometimes used (as a reduction-oxidation catalyst) with the vinyl compounds. Regulators of chain length that may be used are dodecyl mercaptan, acetaldehyde, and carbon tetrachloride.

Buffers such as alkali metal bicarbonates, borates, or carbonates may be introduced.

Anticorrosion agents such as sodium nitrite may be incorporated in the compositions to be used on metal.

Ingredients of any of the various classes may be used alone or mixed with others of the same class.

Proportions are varied in accordance with the properties desired in the finished dried film, that is, the film left on evaporation.

Permissible proportions of the several components and suitable commercial proportions for best results under usual circumstances are shown in the following table. Proportions here and elsewhere herein are expressed as parts by weight on the dry basis unless definitely stated to the contrary.

| Component Used | Parts | |
|---|---|---|
| | Permissible Range | Commercial |
| Vinyl acetate polymer | 100 | 100 |
| Starch | 2-15 | 3-10 |
| Surface active agent | 0.5-5 | 1-3 |
| Preservative for starch | 2-6 | 3-4 |
| Plasticizer | 4-20 | 7-15 |
| Pigment | 20-200 | 30-160 |
| Extender of pigment | 0-250 | 0-200 |
| Defoamer | 0.1 | 0.3-0.7 |
| Miscellaneous ingredients | Usual | Usual |
| Water | As desired | 70-150 |

Smaller proportions of starch within the range stated increase the water resistance of the final film of the paint. Larger amounts in proportion to the vinyl acetate content decrease the amount of pigment (including extenders) required for non-tackiness of film and decrease the amount of costly polyvinyl acetate used.

Proportions of minor ingredients are conventional and are illustrated in the examples.

A representative procedure that may be followed in polymerizing the vinyl acetate in contact with gelatinized starch and other examples of the practice of the invention follow.

*Example 1*

A starch and polyvinyl acetate emulsion was made of the following proportions:

| Component of Emulsion | Proportion |
|---|---|
| Vinyl acetate | 538.0 |
| Chain length regulator (dodecyl mercaptan) | 1.08 |
| Amioca starch (pregelatinized) | 23.6 |
| Water | 382.2 |
| Activator (potassium persulfate), weight of 5% solution | 26.2 |
| Surface active agent (Triton X-200) | 4.8 |
| Buffer (sodium bicarbonate), weight of 5% solution | 16.2 |

The content of polyvinyl acetate in the finished emulsion is about 54% of the wet weight.

The starch, water, and half the buffer and surface active agent were stirred together and the temperature was raised to 75° C. The regulator was then added, followed by two-thirds of the activator. Then the vinyl acetate monomer was added slowly. The temperature was elevated to the range 80°–88° C. within ½ hour from the time introduction of vinyl acetate monomer began. One-third portion of the remaining buffer solution and one-third portion of the remaining activator solution were added after each third of the vinyl acetate had been added.

When all the components had been so mixed, blended and reacted, the heating was continued until there was no further substantial change in the composition. The vinyl acetate at that stage was substantially completely polymerized in close association with the gelatinized starch.

*Example 2*

A polyvinyl acetate semi-gloss paint was made of the following formula:

| Component of Paint | Proportion for 100 PVAc. |
|---|---|
| Titanium dioxide, rutile type | 80.0 |
| Triton X-100 | 1.2 |
| Defoamer | 0.4 |
| Dowicide A (50% solution) | 1.6 |
| Dibutyl phthalate | 4.0 |
| Pregelatinized amioca (waxy cornstarch) added in 5% solution, solution weight | 80.0 |
| Grind above in a paint mill, then add and mix in starch and polyvinyl acetate emulsion of Example 1, wet weight | 100.0 |

*Example 3*

The procedure and formula of Examples 1 and 2 were followed except that the vinyl acetate and starch emulsion used and the subsequent paint formulation were made with the following materials, in the proportions shown.

The vinyl acetate here is in the form of an internally plasticized copolymer.

| Component of Emulsion | Proportion |
|---|---|
| Vinyl 2-ethylhexoate | 107.5 |
| Vinyl acetate | 430.5 |
| Chain length regulator (dodecyl mercaptan) | 1.62 |
| Pregelatinized amioca starch powder | 23.6 |
| Water | 332.2 |
| Activator (potassium persulfate)[1] | 68.0 |
| Surface active agent (Triton 200) | 4.8 |
| Buffer (sodium bicarbonate)[1] | 20.5 |
| Coalescing agent (monobutyl ether of ethylene glycol) | 5.0 |

[1] Weight of 5% solution in water.

Mix the water with 60% of the buffer, all the starch, surface active agent, and coalescing agent. Elevate the temperature to 82° C. and add one-fourth of the activator solution. Add the mixed vinyl 2-ethyl hexoate and the vinyl acetate slowly and simultaneously flow in the balance of the activator solution. Add one-third portion of the balance of the buffer after each one-third of the monomer mixture has been added. The chain length regulator is added after 15% of the monomer mixture is added. Heat until there is no further substantial change in the composition.

This product emulsion "2051-37B" was then used in a paint of the following overall formula:

| Component of Paint | Proportion |
|---|---|
| Titanium dioxide (rutile) | 47.5 |
| Triton X-100 | 0.5 |
| Pregelatinized amioca starch, weight of 5% solution | 30.0 |
| Defoamer | 0.3 |
| Ethylene glycol | 5.0 |
| Preservative (Dowicide A, 50% solution) | 1.6 |
| The above is ground, then there is added vinyl copolymer and starch emulsion "2051-37B" | 100.0 |

Example 4

A gloss paint is made according to the procedure and formula of Example 2 or 3 except that the proportion of pigment was reduced to 20 parts for 100 of the vinyl component on the dry basis. The product in use dried to a non-tacky, non-blocking film.

Example 5

A primer and sealer was prepared as follows:

| Component of Primer and Sealer | Proportion |
|---|---|
| Surface active agent (Triton X-100) | 3 |
| Surface active agent (lecithin) | 3 |
| Anticorrosion agent (sodium nitrite) | 1 |
| Preservative (Dowicide A), weight of 5% solution | 4 |
| Ethylene glycol | 20 |
| Monethyl ether of ethylene glycol | 9 |
| Titanium oxide | 100 |
| Wollastonite | 150 |
| Defoamer | 1 |
| Dibutyl phthalate | 10 |
| Water | 150 |
| Grind the above mix, then introduce polyvinyl acetate and starch emulsion of Example 1 | 250 |
| Pregelatinized amioca starch, 5%, weight of solution | 250 |
| Water | 110 |

The final mix was entirely satisfactory as a primer and sealer.

Example 6

The procedure of Examples 1–5 is followed except that each of the components stated in the table thereof is substituted, in turn, on an equal weight basis by each of the alternatives therefor given earlier herein.

Coating compositions made as described above have superior flow, excellent brushing and drying characteristics, do not show blocking in stacks of materials having surfaces coated with the final finishing composition and then dried, and blend without precipitation with emulsified butadiene-styrene polymers.

Example 7

There are mixed 100 parts of primer and sealer as described in Example 5 and 100 parts of butadiene-styrene latex paint of the following formula:

| Component | Parts |
|---|---|
| Titanium dioxide | 57 |
| Clay | 28 |
| Talc | 21 |
| 15% casein solution in water | 28 |
| Defoamer (any conventional) | 0.3 |
| Water | 43 |
| Ethylene glycol | 6 |
| Lecithin | 1.5 |
| Then add— | |
| Butadiene-styrene latex (33.3% butadiene, 66.7% styrene, 48% solids) | 100 |
| Water | 43 |
| Dowicide A solution (50%) | 1.5 |

The last three components are mixed together and then with the premixed suspension of the other ingredients.

The final product is a satisfactory finishing composition that dries to a non-tacky film.

Example 8

The procedure of Example 3 is followed except that the vinyl 2-ethylhexoate in the proportion there used is replaced in turn by 2–50 parts of vinyl 2-ethylhexylacrylate, dialkyl fumarate, dialkyl maleate, and vinyl 2-ethylhexoate for 100 of the vinyl acetate, the alkyl group in the fumarate and maleate being any $C_1$–$C_{10}$ alkyl.

It is to be understood that it is intended to cover all changes and modifications of the examples of the invention herein chosen for the purpose of illustration which do not constitute departures from the spirit and scope of the invention.

The invention as claimed is:

1. A water paint comprising an intimate mixture of an aqueous emulsion of the product of polymerizing 100 parts dry weight of vinyl acetate in contact with (1) an activator of polymerization of vinyl acetate, (2) 2–10 parts of pregelatinized waxy maize starch in solution in water at all times during the polymerization, and (3) 0.5–5 parts of a surfactant selected from the group consisting of anionic and nonionic surfactants, the said emulsion serving as the vehicle for the paint; and 20–200 parts of paint pigment admixed with the said vehicle, the vinyl acetate being in substantially completely polymerized condition.

2. The paint of claim 1, the said surfactant being selected from the group consisting of alkyl aryl polyether alcohols, the sodium salt of octylphenoxyethoxyethyl sulfonic acid, sodium dodecylbenzene sulfonate, dioctyl ester of sodium sulfosuccinic acid, lecithin, and the condensation product of oleyl alcohol with 20 moles of ethylene oxide.

References Cited in the file of this patent

UNITED STATES PATENTS 2,662,866    Bristol _____ Dec. 15, 1953

FOREIGN PATENTS 703,005    Great Britain _____ Jan. 27, 1954
726,927    Great Britain _____ Mar. 23, 1955